US009071583B2

(12) United States Patent
Yang et al.

(10) Patent No.: US 9,071,583 B2
(45) Date of Patent: Jun. 30, 2015

(54) PROVISIONED CONFIGURATION FOR AUTOMATIC WIRELESS CONNECTION (75) Inventors: Bo-Chieh Yang, San Jose, CA (US); Ming Sheu, San Jose, CA (US); Ted Tsei Kuo, Palo Alto, CA (US); Tian-Yuan Lin, Fremont, CA (US); Tyan-Shu Jou, Fremont, CA (US)

(73) Assignee: Ruckus Wireless, Inc., Sunnyvale, CA (US)

( * ) Notice: Subject to any disclaimer, the term of this patent is extended or adjusted under 35 U.S.C. 154(b) by 394 days.

(21) Appl. No.: 11/789,446

(22) Filed: Apr. 23, 2007

(65) Prior Publication Data

US 2007/0287450 A1    Dec. 13, 2007

Related U.S. Application Data (63) Continuation-in-part of application No. 11/788,371, filed on Apr. 18, 2007.

(60) Provisional application No. 60/794,625, filed on Apr. 24, 2006, provisional application No. 60/796,845, filed on May 2, 2006.

(51) Int. Cl.
H04W 12/00 (2009.01)
H04L 29/06 (2006.01)
(Continued)

(52) U.S. Cl.
CPC .............. *H04L 63/06* (2013.01); *H04L 63/08* (2013.01); *H04L 63/0869* (2013.01);
(Continued)

(58) Field of Classification Search
CPC ..... H04W 12/04; H04W 74/00; H04W 84/12; H04L 9/083; H04L 9/0869; H04L 9/0891; H04L 63/068; H04L 63/0428; H04L 2209/80

USPC ................. 455/410, 411, 418, 419, 433, 434; 713/168–175; 726/1–4, 10, 21; 709/220, 228, 229
See application file for complete search history.

(56) References Cited

U.S. PATENT DOCUMENTS 4,176,356 A    11/1979  Foster et al.
4,193,077 A     3/1980  Greenberg et al.
(Continued)

FOREIGN PATENT DOCUMENTS

CN    1708162 A    12/2005
CN    1316862      10/2010
(Continued)

OTHER PUBLICATIONS

Extended European Search Report for EP application No. 07755678.5 mailed Dec. 29, 2011.
(Continued)

Primary Examiner — Khawar Iqbal
(74) Attorney, Agent, or Firm — Lewis Roca Rothgerber LLP (57) ABSTRACT Systems and methods for provisioned configuration of wireless devices to allow access to restricted wireless networks are provided. Using an open wireless or wired network, a user of a wireless device may be authenticated. A configuration application, which includes the parameters and policies of the provisioned configuration, is generated, transferred to, and executed on the wireless device. Following configuration by the application, the wireless device is allowed to access the restricted wireless network within the parameters and policies of the provisioned configuration.

28 Claims, 4 Drawing Sheets (51) Int. Cl.
  *H04W 12/04*  (2009.01)
  *H04W 12/06*  (2009.01)
  *H04W 8/18*  (2009.01)

(52) U.S. Cl.
  CPC .......... *H04L 63/0876* (2013.01); *H04L 63/101* (2013.01); *H04L 63/102* (2013.01); *H04W 8/18* (2013.01); *H04W 12/04* (2013.01); *H04W 12/06* (2013.01)

(56) References Cited

U.S. PATENT DOCUMENTS

| | | | |
|---|---|---|---|
| 4,253,193 A | 2/1981 | Kennard et al. | |
| 4,305,052 A | 12/1981 | Baril et al. | |
| 4,513,412 A | 4/1985 | Cox | |
| 4,814,777 A | 3/1989 | Monser | |
| 5,097,484 A | 3/1992 | Akaiwa | |
| 5,173,711 A | 12/1992 | Takeuchi et al. | |
| 5,203,010 A | 4/1993 | Felix et al. | |
| 5,220,340 A | 6/1993 | Shafai | |
| 5,373,548 A | 12/1994 | McCarthy | |
| 5,507,035 A | 4/1996 | Bantz et al. | |
| 5,559,800 A | 9/1996 | Mousseau et al. | |
| 5,754,145 A | 5/1998 | Evans | |
| 5,767,809 A | 6/1998 | Chuang et al. | |
| 5,802,312 A | 9/1998 | Lazaridis et al. | |
| 5,964,830 A | 10/1999 | Durett | |
| 6,034,638 A | 3/2000 | Thiel et al. | |
| 6,094,177 A | 7/2000 | Yamamoto | |
| 6,266,528 B1 | 7/2001 | Farzaneh | |
| 6,292,153 B1 | 9/2001 | Aiello et al. | |
| 6,307,524 B1 | 10/2001 | Britain | |
| 6,317,599 B1 | 11/2001 | Rappaport et al. | |
| 6,326,922 B1 | 12/2001 | Hegendoerfer | |
| 6,337,628 B2 | 1/2002 | Campana, Jr. | |
| 6,337,668 B1 | 1/2002 | Ito et al. | |
| 6,339,404 B1 | 1/2002 | Johnson et al. | |
| 6,345,043 B1 | 2/2002 | Hsu | |
| 6,356,242 B1 | 3/2002 | Ploussios | |
| 6,356,243 B1 | 3/2002 | Schneider et al. | |
| 6,356,905 B1 | 3/2002 | Gershman et al. | |
| 6,377,227 B1 | 4/2002 | Zhu et al. | |
| 6,392,610 B1 | 5/2002 | Braun et al. | |
| 6,404,386 B1 | 6/2002 | Proctor, Jr. et al. | |
| 6,407,719 B1 | 6/2002 | Ohira et al. | |
| 6,442,507 B1 | 8/2002 | Skidmore et al. | |
| 6,445,688 B1 | 9/2002 | Garces et al. | |
| 6,493,679 B1 | 12/2002 | Rappaport et al. | |
| 6,498,589 B1 | 12/2002 | Horii | |
| 6,499,006 B1 | 12/2002 | Rappaport et al. | |
| 6,507,321 B2 | 1/2003 | Oberschmidt et al. | |
| 6,625,454 B1 | 9/2003 | Rappaport et al. | |
| 6,674,459 B2 | 1/2004 | Ben-Shachar et al. | |
| 6,701,522 B1 | 3/2004 | Rubin et al. | |
| 6,725,281 B1 | 4/2004 | Zintel et al. | |
| 6,753,814 B2 | 6/2004 | Killen et al. | |
| 6,762,723 B2 | 7/2004 | Nallo et al. | |
| 6,772,331 B1 | 8/2004 | Hind et al. | |
| 6,779,004 B1 | 8/2004 | Zintel | |
| 6,807,577 B1 | 10/2004 | Gillespie et al. | |
| 6,819,287 B2 | 11/2004 | Sullivan et al. | |
| 6,876,280 B2 | 4/2005 | Nakano | |
| 6,888,504 B2 | 5/2005 | Chiang et al. | |
| 6,888,893 B2 | 5/2005 | Li et al. | |
| 6,892,230 B1 | 5/2005 | Gu et al. | |
| 6,906,678 B2 | 6/2005 | Chen | |
| 6,910,068 B2 | 6/2005 | Zintel et al. | |
| 6,924,768 B2 | 8/2005 | Wu et al. | |
| 6,931,429 B2 | 8/2005 | Gouge et al. | |
| 6,941,143 B2 | 9/2005 | Mathur | |
| 6,947,727 B1 | 9/2005 | Brynielsson | |
| 6,950,019 B2 | 9/2005 | Bellone et al. | |
| 6,950,523 B1 | 9/2005 | Brickell et al. | |
| 6,961,028 B2 | 11/2005 | Joy et al. | |
| 6,973,622 B1 | 12/2005 | Rappaport et al. | |
| 6,975,834 B1 | 12/2005 | Forster | |
| 7,034,770 B2 | 4/2006 | Yang et al. | |
| 7,043,277 B1 | 5/2006 | Pfister | |
| 7,043,633 B1 | 5/2006 | Fink | |
| 7,050,809 B2 | 5/2006 | Lim | |
| 7,064,717 B2 | 6/2006 | Kaluzni et al. | |
| 7,085,814 B2 | 8/2006 | Gandhi et al. | |
| 7,089,307 B2 | 8/2006 | Zintel et al. | |
| 7,127,234 B2 | 10/2006 | Ishii | |
| 7,130,895 B2 | 10/2006 | Zintel et al. | |
| 7,171,475 B2 | 1/2007 | Weisman et al. | |
| 7,181,620 B1 | 2/2007 | Hur | |
| 7,197,297 B2 | 3/2007 | Myles | |
| 7,234,063 B1 | 6/2007 | Baugher et al. | |
| 7,234,156 B2 | 6/2007 | French et al. | |
| 7,263,076 B1 | 8/2007 | Leibovitz et al. | |
| 7,292,870 B2 | 11/2007 | Heredia et al. | |
| 7,363,354 B2 * | 4/2008 | Lahti | 709/219 |
| 7,421,578 B1 | 9/2008 | Huang et al. | |
| 7,477,894 B1 | 1/2009 | Sinha | |
| 7,505,434 B1 | 3/2009 | Backes | |
| 7,562,385 B2 | 7/2009 | Thione et al. | |
| 7,565,529 B2 | 7/2009 | Beck | |
| 7,599,380 B2 | 10/2009 | Whitten | |
| 7,669,232 B2 | 2/2010 | Jou | |
| 7,715,833 B2 * | 5/2010 | Sanchez | 455/419 |
| 7,722,502 B2 | 5/2010 | Holkkola | |
| 7,788,703 B2 * | 8/2010 | Jou et al. | 726/2 |
| 7,966,497 B2 | 6/2011 | Gantman et al. | |
| 8,005,459 B2 | 8/2011 | Balsillie | |
| 8,009,644 B2 | 8/2011 | Kuo | |
| 8,091,120 B2 | 1/2012 | Perrella et al. | |
| 8,108,904 B1 * | 1/2012 | Chickering et al. | 726/2 |
| 8,260,278 B2 * | 9/2012 | Landsman et al. | 455/418 |
| 8,272,036 B2 | 9/2012 | Jou | |
| 8,355,912 B1 | 1/2013 | Keesey et al. | |
| 8,605,697 B2 | 12/2013 | Kuo | |
| 8,607,315 B2 | 12/2013 | Jou | |
| 8,756,668 B2 | 6/2014 | Ranade et al. | |
| 8,923,265 B2 | 12/2014 | Kuo | |
| 2002/0009199 A1 | 1/2002 | Ala-Laurila | |
| 2002/0022483 A1 | 2/2002 | Thompson | |
| 2002/0031130 A1 | 3/2002 | Tsuchiya et al. | |
| 2002/0047800 A1 | 4/2002 | Proctor, Jr. et al. | |
| 2002/0080767 A1 | 6/2002 | Lee | |
| 2002/0084942 A1 | 7/2002 | Tsai et al. | |
| 2002/0105471 A1 | 8/2002 | Kojima et al. | |
| 2002/0112058 A1 | 8/2002 | Weisman et al. | |
| 2002/0158798 A1 | 10/2002 | Chiang et al. | |
| 2002/0169966 A1 | 11/2002 | Nyman et al. | |
| 2002/0170064 A1 | 11/2002 | Monroe et al. | |
| 2003/0026240 A1 | 2/2003 | Eyuboglu et al. | |
| 2003/0030588 A1 | 2/2003 | Kalis et al. | |
| 2003/0063591 A1 | 4/2003 | Leung et al. | |
| 2003/0122714 A1 | 7/2003 | Wannagot et al. | |
| 2003/0156558 A1 | 8/2003 | Cromer et al. | |
| 2003/0162533 A1 * | 8/2003 | Moles et al. | 455/419 |
| 2003/0169330 A1 | 9/2003 | Ben-Shachar et al. | |
| 2003/0184490 A1 | 10/2003 | Raiman et al. | |
| 2003/0189514 A1 | 10/2003 | Miyano et al. | |
| 2003/0189521 A1 | 10/2003 | Yamamoto et al. | |
| 2003/0189523 A1 | 10/2003 | Ojantakanen et al. | |
| 2003/0191935 A1 | 10/2003 | Ferguson | |
| 2003/0196084 A1 | 10/2003 | Okereke et al. | |
| 2003/0202486 A1 | 10/2003 | Anton et al. | |
| 2003/0210207 A1 | 11/2003 | Suh et al. | |
| 2003/0227414 A1 | 12/2003 | Saliga et al. | |
| 2004/0014432 A1 | 1/2004 | Boyle | |
| 2004/0017310 A1 | 1/2004 | Runkle et al. | |
| 2004/0017860 A1 | 1/2004 | Liu | |
| 2004/0027291 A1 | 2/2004 | Zhang et al. | |
| 2004/0027304 A1 | 2/2004 | Chiang et al. | |
| 2004/0030900 A1 | 2/2004 | Clark | |
| 2004/0032378 A1 | 2/2004 | Volman et al. | |
| 2004/0036651 A1 | 2/2004 | Toda | |
| 2004/0036654 A1 | 2/2004 | Hsieh | |
| 2004/0041732 A1 | 3/2004 | Aikawa et al. | |
| 2004/0048593 A1 | 3/2004 | Sano | |
| 2004/0058690 A1 | 3/2004 | Ratzel et al. | |

(56) References Cited

U.S. PATENT DOCUMENTS

| | | |
|---|---|---|
| 2004/0061653 A1 | 4/2004 | Webb et al. |
| 2004/0070543 A1 | 4/2004 | Masaki |
| 2004/0073786 A1 | 4/2004 | O'Neill et al. |
| 2004/0080455 A1 | 4/2004 | Lee |
| 2004/0095278 A1 | 5/2004 | Kanemoto et al. |
| 2004/0097217 A1 | 5/2004 | McClain |
| 2004/0114535 A1 | 6/2004 | Hoffmann et al. |
| 2004/0121749 A1 | 6/2004 | Cui et al. |
| 2004/0125777 A1 | 7/2004 | Doyle et al. |
| 2004/0141617 A1 | 7/2004 | Volpano |
| 2004/0153647 A1 | 8/2004 | Rotholtz et al. |
| 2004/0190477 A1 | 9/2004 | Olson et al. |
| 2004/0203593 A1 | 10/2004 | Whelan et al. |
| 2004/0214570 A1* | 10/2004 | Zhang et al. ............... 455/426.2 |
| 2004/0214572 A1 | 10/2004 | Thompson et al. |
| 2004/0260800 A1 | 12/2004 | Gu et al. |
| 2005/0022210 A1 | 1/2005 | Zintel et al. |
| 2005/0041739 A1 | 2/2005 | Li et al. |
| 2005/0042988 A1 | 2/2005 | Hoek et al. |
| 2005/0050352 A1 | 3/2005 | Narayanaswami et al. |
| 2005/0074018 A1 | 4/2005 | Zintel |
| 2005/0097503 A1 | 5/2005 | Zintel et al. |
| 2005/0100166 A1 | 5/2005 | Smetters et al. |
| 2005/0129222 A1 | 6/2005 | Creamer et al. |
| 2005/0135480 A1 | 6/2005 | Li et al. |
| 2005/0138137 A1 | 6/2005 | Encarnacion et al. |
| 2005/0138193 A1 | 6/2005 | Encarnacion et al. |
| 2005/0152305 A1 | 7/2005 | Ji et al. |
| 2005/0165953 A1 | 7/2005 | Oba et al. |
| 2005/0180381 A1 | 8/2005 | Retzer et al. |
| 2005/0188193 A1 | 8/2005 | Kuehnel et al. |
| 2005/0220048 A1 | 10/2005 | Lee et al. |
| 2005/0222933 A1* | 10/2005 | Wesby ............................ 705/36 |
| 2005/0228874 A1 | 10/2005 | Edgett |
| 2005/0240665 A1 | 10/2005 | Gu et al. |
| 2005/0250472 A1 | 11/2005 | Silvester |
| 2005/0261970 A1 | 11/2005 | Vucina |
| 2005/0267935 A1 | 12/2005 | Gandhi et al. |
| 2005/0268107 A1 | 12/2005 | Harris et al. |
| 2006/0007897 A1 | 1/2006 | Ishii |
| 2006/0031922 A1 | 2/2006 | Sakai |
| 2006/0046730 A1 | 3/2006 | Briancon et al. |
| 2006/0052085 A1 | 3/2006 | Gregrio Rodriguez |
| 2006/0080415 A1 | 4/2006 | Tu |
| 2006/0080741 A1 | 4/2006 | Nair |
| 2006/0089123 A1 | 4/2006 | Frank |
| 2006/0094371 A1 | 5/2006 | Nguyen |
| 2006/0094400 A1 | 5/2006 | Beachem et al. |
| 2006/0098607 A1 | 5/2006 | Zeng et al. |
| 2006/0123124 A1 | 6/2006 | Weisman et al. |
| 2006/0123125 A1 | 6/2006 | Weisman et al. |
| 2006/0123455 A1 | 6/2006 | Pai et al. |
| 2006/0133405 A1 | 6/2006 | Fee |
| 2006/0165103 A1 | 7/2006 | Trudeau et al. |
| 2006/0168159 A1 | 7/2006 | Weisman et al. |
| 2006/0184660 A1 | 8/2006 | Rao et al. |
| 2006/0184661 A1 | 8/2006 | Weisman et al. |
| 2006/0184693 A1 | 8/2006 | Rao et al. |
| 2006/0189298 A1 | 8/2006 | Marcelli |
| 2006/0200851 A1 | 9/2006 | Hung |
| 2006/0223527 A1 | 10/2006 | Lee et al. |
| 2006/0224690 A1 | 10/2006 | Falkenburg et al. |
| 2006/0225107 A1 | 10/2006 | Seetharaman et al. |
| 2006/0227761 A1 | 10/2006 | Scott, III et al. |
| 2006/0239369 A1 | 10/2006 | Lee |
| 2006/0251256 A1 | 11/2006 | Asokan et al. |
| 2006/0291434 A1 | 12/2006 | Gu et al. |
| 2007/0025302 A1* | 2/2007 | Zhang et al. ................. 370/338 |
| 2007/0027622 A1 | 2/2007 | Cleron et al. |
| 2007/0047449 A1 | 3/2007 | Berger et al. |
| 2007/0055752 A1 | 3/2007 | Wiegand et al. |
| 2007/0124490 A1 | 5/2007 | Kalavade et al. |
| 2007/0130294 A1 | 6/2007 | Nishio |
| 2007/0130456 A1 | 6/2007 | Kuo |
| 2007/0135167 A1 | 6/2007 | Liu |
| 2007/0143832 A1 | 6/2007 | Perrella et al. |
| 2007/0150736 A1 | 6/2007 | Cukier et al. |
| 2007/0165582 A1 | 7/2007 | Batta |
| 2007/0189537 A1* | 8/2007 | Zhang et al. ................. 380/273 |
| 2007/0199053 A1 | 8/2007 | Sandhu |
| 2007/0211659 A1 | 9/2007 | Li |
| 2007/0249324 A1 | 10/2007 | Jou |
| 2007/0293951 A1 | 12/2007 | Takahashi |
| 2007/0294528 A1 | 12/2007 | Shoji |
| 2008/0060064 A1 | 3/2008 | Wynn et al. |
| 2008/0075280 A1 | 3/2008 | Ye et al. |
| 2008/0085723 A1 | 4/2008 | Tsao et al. |
| 2008/0109657 A1 | 5/2008 | Bajaj et al. |
| 2008/0119165 A1 | 5/2008 | Mittal et al. |
| 2008/0141244 A1* | 6/2008 | Kelley ............................ 717/178 |
| 2008/0208617 A1* | 8/2008 | Onyon et al. ...................... 705/1 |
| 2008/0212535 A1 | 9/2008 | Karaoguz et al. |
| 2008/0307515 A1 | 12/2008 | Drokov |
| 2009/0005005 A1 | 1/2009 | Forstall et al. |
| 2009/0013210 A1 | 1/2009 | McIntosh et al. |
| 2009/0092255 A1* | 4/2009 | Jou et al. ........................ 380/279 |
| 2009/0103731 A1 | 4/2009 | Sarikaya |
| 2009/0119190 A1* | 5/2009 | Realini ............................ 705/30 |
| 2009/0187970 A1 | 7/2009 | Mower et al. |
| 2009/0193118 A1 | 7/2009 | Cox et al. |
| 2009/0217048 A1 | 8/2009 | Smith |
| 2010/0070542 A1* | 3/2010 | Feinsmith ...................... 707/812 |
| 2010/0299518 A1 | 11/2010 | Viswanathan et al. |
| 2010/0332828 A1 | 12/2010 | Goto |
| 2011/0007705 A1 | 1/2011 | Buddhikot et al. |
| 2011/0035624 A1 | 2/2011 | Miller |
| 2011/0040870 A1 | 2/2011 | Wynn et al. |
| 2011/0047603 A1 | 2/2011 | Gordon et al. |
| 2011/0055898 A1 | 3/2011 | Jou |
| 2011/0126016 A1 | 5/2011 | Sun |
| 2011/0208866 A1 | 8/2011 | Marmolejo-Meillon et al. |
| 2011/0271111 A1 | 11/2011 | Frank et al. |
| 2011/0281609 A1 | 11/2011 | Kuo |
| 2012/0030466 A1 | 2/2012 | Yamaguchi |
| 2012/0054338 A1 | 3/2012 | Ando |
| 2012/0089845 A1 | 4/2012 | Raleigh |
| 2012/0134291 A1 | 5/2012 | Raleigh |
| 2012/0257536 A1 | 10/2012 | Kholaif et al. |
| 2012/0278654 A1 | 11/2012 | Shen |
| 2012/0284785 A1 | 11/2012 | Salkintzis et al. |
| 2012/0317625 A1 | 12/2012 | Jou |
| 2012/0322035 A1 | 12/2012 | Julia et al. |
| 2013/0007853 A1 | 1/2013 | Gupta et al. |
| 2013/0047218 A1 | 2/2013 | Smith |
| 2013/0182693 A1 | 7/2013 | Sperling et al. |
| 2013/0269008 A1 | 10/2013 | Shtrom |
| 2014/0066112 A1 | 3/2014 | Kuo |
| 2014/0068724 A1 | 3/2014 | Jou |
| 2014/0282951 A1 | 9/2014 | Ranade |

FOREIGN PATENT DOCUMENTS

| | | |
|---|---|---|
| CN | 103441984 | 12/2013 |
| CN | 103858106 | 6/2014 |
| EP | 0352787 | 7/1989 |
| EP | 0 534 612 | 3/1993 |
| EP | 1 315 311 | 5/2003 |
| EP | 1 450 521 | 8/2004 |
| EP | 1 608 108 | 12/2005 |
| EP | 1638261 A1 | 3/2006 |
| EP | 1724691 | 11/2006 |
| EP | 2 705 429 | 3/2014 |
| EP | 1 958 369 | 4/2015 |
| JP | 3038933 | 7/1989 |
| JP | 2008/088633 | 2/1996 |
| JP | 2001/057560 | 2/2002 |
| JP | 2005/354249 | 12/2005 |
| JP | 2006/060408 | 3/2006 |
| JP | 2014-522142 | 8/2014 |
| TW | 201351188 | 12/2013 |
| WO | WO0184323 A1 | 11/2001 |
| WO | WO 02/25967 | 3/2002 |
| WO | WO 03/079484 | 9/2003 |
| WO | WO 2007/064822 | 6/2007 |

(56) References Cited

FOREIGN PATENT DOCUMENTS

| WO | WO 2007/127120 | 11/2007 |
|---|---|---|
| WO | WO 2007/127162 | 11/2007 |
| WO | WO 2012/151224 | 11/2012 |
| WO | WO 2013/119750 | 8/2013 |
| WO | WO 2013/152027 | 10/2013 |

OTHER PUBLICATIONS

Chinese Office Action for CN application No. 200780019389.2 mailed Feb. 27, 2012.
Aboba, Bernard. "Virtual Access Points." IEEEP802.11 Wireless LANs, XX, XX, No. 802.11-03/154rl, May 22, 2003, pp. 1-13. XP002425027.
"Diversity Antennas for Portable Telephones", Kouichi Tsunekawa, 39th IEEE Vehicular Technology Conference, vol. 1, pp. 50-56.
Extended European Search Report for EP application No. 06838713.3 mailed Jul. 13, 2011.
Markus Keidl et al. Reliable Web Service Execution and Deployment in Dynamic Environments. Univeritat Passau, Germany, pp. 104-118.
U.S. Appl. No. 11/788,371, Tyan-Shu Jou, Dynamic Authentication in Secured Wireless Networks, filed Apr. 18, 2007.
Ken Tang, et al., "MAC Layer Broadcast Support in 802.11 Wireless Networks," Computer Science Department, University of California, Los Angeles, 2000 IEEE, pp. 544-548.
Ken Tang, et al., "MAC Reliable Broadcast in Ad Hoc Networks," Computer Science Department, University of California, Los Angeles, 2001 IEEE, pp. 1008-1013.
Vincent D. Park, et al., "A Performance Comparison of the Temporally-Ordered Routing Algorithm and Ideal Link-State Routing," IEEE, Jul. 1998, pp. 592-598.
Ian F. Akyildiz, et al., "A Virtual Topology Based Routing Protocol for Multihop Dynamic Wireless Networks," Broadband and Wireless Networking Lab, School of Electrical and Computer Engineering, Georgia Institute of Technology.
Dell Inc., "How Much Broadcast.And Multicast Traffic Should I Allow in My Network," PowerConnect Application Note #5, Nov. 2003.
Toskala, Antti, "Enhancement of Broadcast and Introduction of Multicast Capabilities in RAN," Nokia Networks, Palm Springs, California, Mar. 13-16, 2001.
Microsoft Corporation, "IEEE 802.11 Networks and Windows XP," Windows Hardware Developer Central, Dec. 4, 2001.
Festag, Andreas, "What is MOMBASA?" Telecommunication Networks Group (TKN), Technical University of Berlin, Mar. 7, 2002.
Hewlett Packard, "HP ProCurve Networking: Enterprise Wireless LAN Networking and Mobility Solutions," 2003.
Dutta, Ashutosh et al., "MarconiNet Supporting Streaming Media Over Localized Wireless Multicast," Proc. of the 2d Int'l Workshop on Mobile Commerce, 2002.
Dunkels, Adam et al., "Making TCP/IP Viable for Wireless Sensor Networks," Proc. of the 1st Euro. Workshop on Wireless Sensor Networks, Berlin, Jan. 2004.
Dunkels, Adam et al., "Connecting Wireless Sensornets with TCP/IP Networks," Proc. of the 2d Int'l Conf. on Wired Networks, Frankfurt, Feb. 2004.
Cisco Systems, "Cisco Aironet Access Point Software Configuration Guide: Configuring Filters and Quality of Service," Aug. 2003.
Hirayama, Koji et al., "Next-Generation Mobile-Access IP Network," Hitachi Review vol. 49, No. 4, 2000.
Pat Calhoun et al., "802.11r strengthens wireless voice," Technology Update, Network World, Aug. 22, 2005, http://www.networkworld.com/news/tech/2005/082208techupdate.html.
Areg Alimian et al., "Analysis of Roaming Techniques," doc.:IEEE 802.11-04/0377r1, Submission, Mar. 2004.
Information Society Technologies Ultrawaves, "System Concept / Architecture Design and Communication Stack Requirement Document," Feb. 23, 2004.
Golmie, Nada, "Coexistence in Wireless Networks: Challenges and System-Level Solutions in the Unlicensed Bands," Cambridge University Press, 2006.
Mawa, Rakesh, "Power Control in 3G Systems," Hughes Systique Corporation, Jun. 28, 2006.
Wennstrom, Manias et al., "Transmit Antenna Diversity in Ricean Fading MIMO Channels with Co-Channel Interference," 2001.
Steger, Christopher et al., "Performance of IEEE 802.11b Wireless LAN in an Emulated Mobile Channel," 2003.
Chang, Nicholas B. et al., "Optimal Channel Probing and Transmission Scheduling for Opportunistics Spectrum Access," Sep. 2007.
PCT Application No. PCT/US2006/045893, International Search Report and Written Opinion Sep. 25, 2007.
PCT Application No. PCT/US2007/09836, International Search Report and Written Opinion Sep. 12, 2008.
PCT Application No. PCT/US2007/09503, International Search Report and Written Opinion Mar. 3, 2008.
PCT Application No. PCT/US2012/036028, International Search Report and Written Opinion Aug. 7, 2012.
Chinese Office Action for CN Application No. 200680045272.7 mailed Jul. 12, 2011.
Chinese Office Action for CN Application No. 200680045272.7 mailed Feb. 1, 2011.
Chinese Office Action for CN Application No. 200680045272.7 mailed Jul. 15, 2010.
Chinese Office Action for CN Application No. 200780019074.8 mailed Jun. 15, 2011.
Chinese Office Action for CN Application No. 200780019389.2 mailed Sep. 12, 2012.
Chinese Office Action for CN Application No. 200780019389.2 mailed Apr. 8, 2011.
European First Examination Report for EP Application No. 068387133 mailed Apr. 3, 2012.
European First Examination Report for EP Application No. 07755678.5 dated Oct. 23, 2012.
U.S. Appl. No. 11/607,619, Office Action mailed Oct. 13, 2010.
U.S. Appl. No. 11/607,619, Final Office Action mailed Dec. 4, 2009.
U.S. Appl. No. 11/607,619, Office Action mailed Apr. 29, 2009.
U.S. Appl. No. 11/788,371, Final Office Action mailed Jan. 21, 2010.
U.S. Appl. No. 11/788,371, Office Action mailed Sep. 17, 2009.
U.S. Appl. No. 12/339,688, Office Action mailed Sep. 15, 2009.
U.S. Appl. No. 12/845,089, Final Office Action mailed Feb. 14, 2012.
U.S. Appl. No. 12/845,089, Office Action mailed Sep. 6, 2011.
U.S. Appl. No. 13/461,679, Office Action mailed Apr. 1, 2013.
U.S. Appl. No. 13/461,679, Office Action mailed Mar. 28, 2014.
Supplementary European Search Report for EP application No. 07755678.5 mailed Jan. 17, 2012.
Chinese Office Action for CN Application No. 200680045272.7 mailed Jul. 29, 2013.
European First Examination Report for EP Application No. 07755913.6 dated Jul. 4, 2013.
U.S. Appl. No. 14/078,947, Office Action mailed Sep. 24, 2014.
U.S. Appl. No. 13/461,679, Final Office Action mailed Oct. 25, 2013.
U.S. Appl. No. 13/191,383, Office Action mailed Jul. 22, 2013.
U.S. Appl. No. 13/590,997, Office Action mailed Jul. 18, 2013.
IEEE TrialUse Recommended Practice for Multi-Vendor Access Point Interoperability Via an Inter-Access Point Protocol Across Distribution Systems Supporting IEEE 802.11 Operation; IEEE Std 802.11 F-2003 ED, IEEE Standard, IEEEE, Piscataway, NJ, USA, Jan. 1, 2003, pp. 1-67.
Yang, Song Li, Virtual AP for 802.11 Seamless Handoff draft-song-80211-seamless-handoff-00.txt.
Extended European Search Report for EP application No. 14163071.5 mailed Jul. 4, 2014.
European Second Examination Report for EP Application No. 07755678.5 dated Feb. 3, 2014.
Bargh et al., "Fast Authentication Methods for Handovers between IEEE 802.11 Wireless LANs", Proceedings of the ACM International Workshop on Wireless Mobile Applications and Services on WLAN Hotspots. Oct. 1, 2004.
Encrypted Preshared key; cisco corp. 14 pages, 2010 (Date of Download: Nov. 20, 2013).

(56) References Cited

OTHER PUBLICATIONS

Kassab et al., "Fast Pre-Authentication Based on Proactive Key Distribution for 802.11 Infrastructure Networks", WMuNeP'05, Oct. 13, 2005, Montreal, Quebec, Canada, Copyright 2005 ACM.

PCT Application No. PCT/US2013/34997, International Search Report mailed Jun. 17, 2013.

PCT Application No. PCT/US2013/34997, Written Opinion mailed Jun. 17, 2013 (Date of Online Publication: Oct. 4, 2014).

Chinese Office Action for CN Application No. 200680045272.7 mailed Oct. 27, 2011.

U.S. Appl. No. 14/078,947, Final Office Action mailed Feb. 23, 2015.

U.S. Appl. No. 13/370,201, Office Action mailed May 13, 2013.

U.S. Appl. No. 14/294,012, Office Action mailed Mar. 23, 2015.

U.S. Appl. No. 13/439,844, Office Action mailed Apr. 22, 2014.

U.S. Appl. No. 13/439,844, Final Office Action mailed Oct. 28, 2013.

U.S. Appl. No. 13/439,844, Office Action mailed Jun. 5, 2013.

U.S. Appl. No. 14/692,485, filed Apr. 21, 2015, Ming-Jye Sheu.

Extended European Search Report for EP application No. 12779857.7 dated Mar. 30, 2015.

US 9,015,816, 04/2015, Sheu (withdrawn)

\* cited by examiner

PROVISIONED CONFIGURATION FOR AUTOMATIC WIRELESS CONNECTION

CROSS-REFERENCE TO RELATED APPLICATIONS

The present application is a continuation-in-part of U.S. patent application Ser. No. 11/788,371 filed Apr. 18, 2007 and entitled "Dynamic Authentication in Secured Wireless Networks," which claims the priority benefit of U.S. provisional patent application No. 60/794,625 filed Apr. 24, 2006 and entitled "Mechanisms and Apparatus to Provide Pre-Shared Key Authentication with Dynamic Secret on Wireless Networks" and U.S. provisional patent application No. 60/796,845 filed May 2, 2006 and entitled "Mechanisms and Apparatus for Automatic Wireless Connection Based on Provisioned Configuration." The disclosures of the aforementioned applications are incorporated herein by reference.

BACKGROUND OF THE INVENTION

1. Field of the Invention

The present invention generally relates to information network security. More specifically, the present invention relates to user-friendly systems for configuring wireless devices for access to restricted wireless networks.

2. Description of Related Art

A variety of user authentication and security measures for wireless networks have been proposed by a number of professional organizations. These professional organizations include the Institute of Electrical and Electronics Engineers (IEEE) 802.11 Working Group, the Wi-Fi Alliance, and the Internet Engineering Task Force (IETF). Various other groups such as wireless equipment vendors offer their own proprietary wireless security protocols. Depending on the particular source, implementing these protocols has generally been complicated, difficult to maintain, and requires a high level of technical knowledge by those implementing a particular protocol.

Another complication is that each organization may have specialized needs with respect to security for its wireless networks. For example, different departments within an organization may require different protocols. Some individuals, however, may require access to multiple networks, which requires that their wireless device be configured with multiple protocols. Further, some individuals may require access to particular networks but may not be authorized to access those networks. As such, many commercial organizations (e.g., small- and medium-sized businesses) have difficulties implementing security systems for wireless networks because of their lack of expertise and/or full-time professional technical support.

For example, a network administrator may have the requisite technical knowledge to implement such security systems but may have to configure every wireless client station individually. This is in addition to instructing each user on how to configure their wireless device to conform to certain wireless connection parameters. Further, various technical complications may arise for users and network administrator personnel including different wireless devices and interfaces, different requirements for access, and different restrictions on access.

Notwithstanding the many measures available for securing a wireless network, implementing any one of these measures may be complicated, difficult, and/or require extensive maintenance. There is, therefore, a need in the art for improved systems and methods that provide for restricted access to secured wireless networks that are user-friendly and easily maintained without requiring a high degree of technical expertise and/or ongoing technical support.

SUMMARY OF THE INVENTION

Exemplary systems and methods of the present invention provide for provisioned configuration of wireless devices to allow access to restricted wireless networks. Using an open wireless or wired network, a user of a wireless device may be authenticated. An executable application, which includes the parameters and policies of a provisioned configuration, is generated, transferred to, and executed on the wireless device. Following configuration by the application, the wireless device is allowed to access the restricted wireless network within the parameters and policies of the provisioned configuration as provided through the executable application.

The executable applications providing such provisioned configurations may be generated based on authentication information concerning the user and/or the wireless device. Some embodiments include determining from a provisioned configuration database which parameters and policies are associated with the user and/or wireless device. In some embodiments of the present invention, the application may provide a plurality of provisioned configurations for the wireless device. Each of the plurality of provisioned configurations may include parameters and policies for a plurality of wireless networks. The executable application may be capable of configuring a wireless device for access to a variety of different wireless networks.

Embodiments of the present invention may include systems for provisioned configuration of wireless devices. Such systems may include an authentication module, a processor, and a provisioning module. Some embodiments further include a provisioned configuration database and/or an application generation module.

Some embodiments of the present invention include computer readable storage media and instructions for provisioned configuration of wireless devices. Some embodiments further include instructions for generating configuration applications based on authentication information concerning the user and/or the wireless device.

DETAILED DESCRIPTION

Embodiments of the present invention include systems and methods for user-friendly, low-maintenance configuration of wireless devices for accessing restricted wireless networks. A user of a wireless device is allowed to connect to an open wireless or wired network. After the user is authenticated, an application may be generated that would allow the wireless device to connect to a secured or restricted wireless network. The application, after being transferred to and executed on the wireless device, configures the wireless device so that it may access the restricted wireless network. The configuration, which may also referred to as a provisioned configuration, may be based on user information, wireless device information, or both. In some embodiments, the application may be able to configure the wireless device so that it may access a plurality of wireless networks.

Figure 1:
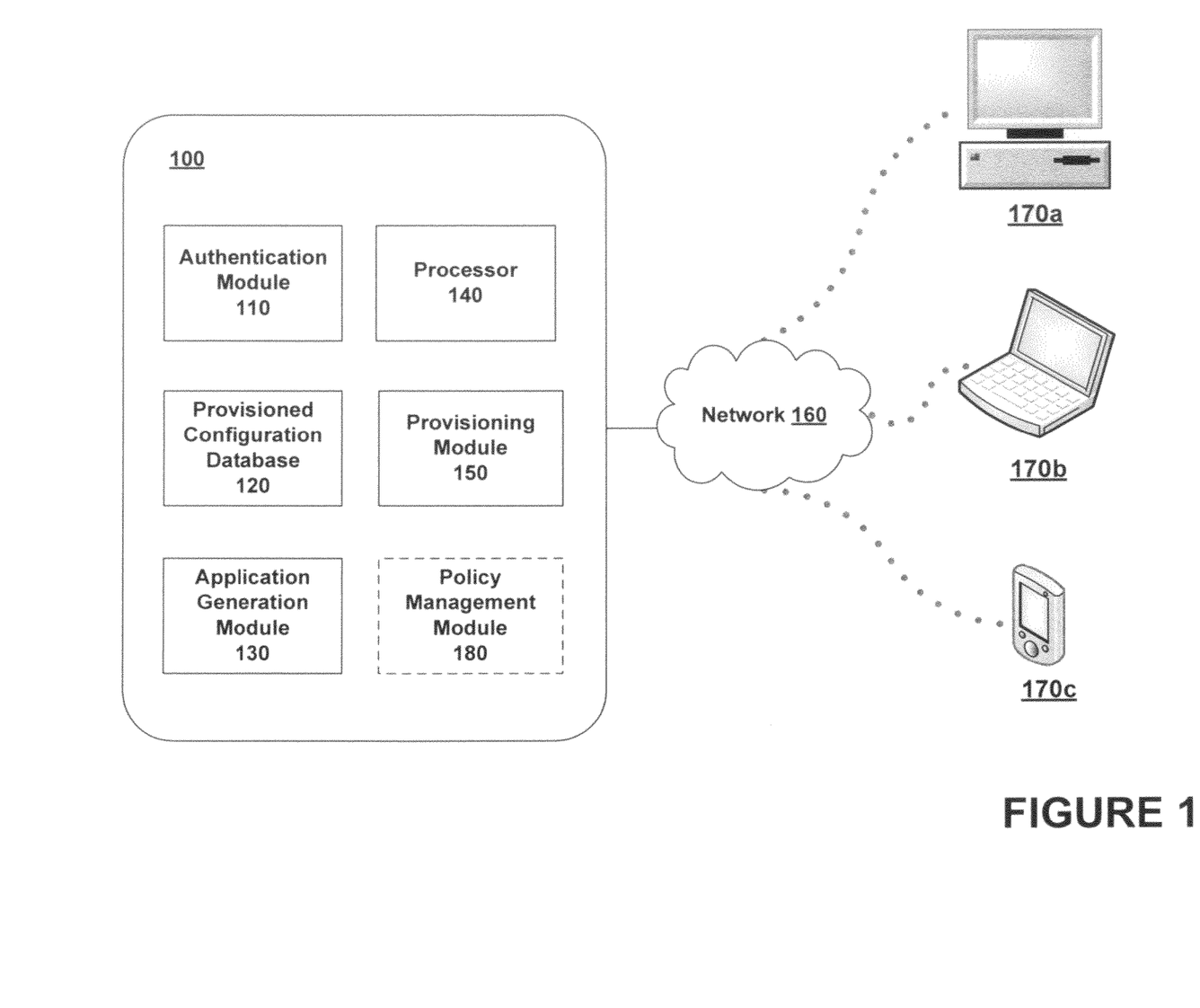
FIG. 1 is an illustration of a system for provisioned configuration of wireless devices to access a restricted wireless network in accordance with an exemplary embodiment of the present invention.

FIG. 1 is an illustration of a system for provisioned configuration of wireless devices to access a restricted wireless network 160 in accordance with an exemplary embodiment of the present invention. Authentication server 100, as illustrated in FIG. 1, includes an authentication module 110, a provisioned configuration database 120, an application generation module 130, a processor 140, a provisioning module 150, and policy management module 180. The authentication server 100 may be used to maintain security in network 160. Various client devices, such as wireless workstation 170a, laptop 170b, and mobile device 170c belong to potential users of network 160.

A module (or application), as referenced in the present invention, should be generally understood as a collection of routines that perform various system-level functions and may be dynamically loaded and unloaded by hardware and device drivers as required. The modular software components described herein may also be incorporated as part of a larger software platform or integrated as part of an application specific component.

Authentication module 110 authenticates a user (e.g., laptop 170b) and verifies that the user is who they purport to be and that they are otherwise authorized to access network 160. The authentication module 110 may be used to verify a user name and password supplied by the user over a wired or wireless network. Verification may occur through comparison with user names and passwords stored in an authentication database, which may be independent of or incorporated into authentication module 110. Once authenticated by authentication module 110, the user may access data and perform actions within network 160 based on the user's security clearance level, the parameters of the user's role in the organization, as defined by a network administrator, and as may be further governed by the parameters and policies of a provisioned configuration. Authentication module 110 may implement certain authentication policies disclosed in U.S. patent application Ser. No. 11/788,371 filed Apr. 18, 2007 and entitled "Dynamic Authentication in Secured Wireless Networks," the disclosure of which has previously been incorporated herein by reference.

Provisioned configuration database 120 stores information concerning various sets of parameters and policies that may be used to configure a wireless device for access to network 160. Provisioned configured database 120 may further store certificates, shared secrets, private keys, and a variety of other information. These parameters and policies may include information used to configure a wireless device for connection to a restricted wireless network and access policies related to the same, such as a wireless network name, wireless device parameters, adapter configurations, security-related parameters, access constraints, quality of service parameters, security-related parameters, and the like. Provisioned configuration database 120 may further store information concerning the users and/or wireless devices associated with one or more provisioned configurations.

In an exemplary embodiment, an authenticated user may request access to a restricted wireless network. A provisioned configuration associated with that user and/or the wireless device belonging to the user may be found by searching provisioned configuration database 120. Once that provisioned configuration is located and subsequently installed on the wireless device belonging to the user, the user is allowed to access the wireless network 160 using the wireless device. Further, the provisioned configuration restricts the user from accessing any portion or sub-sets of the network for which the user is not authorized. Provisioned configuration database 120 may operate in conjunction with and provide provisioned configuration information to other components of authentication server 100, including (but not limited to) application generation module 130, provisioning module 150, and optional policy management module 180.

In some embodiments, and as referenced above, provisioned configuration database 120 may operate in conjunction with application generation module 130. Using a provisioned configuration provided by provisioned configuration database 120, application generation module 130 generates an application for configuring a wireless device according to the provisioned configuration. The application may then be transferred to the wireless device via provisioning module 150 as discussed in further detail herein. The application may execute automatically, or the application may be manually executed by the user. Once executed, the application may survey the wireless device, configure the wireless device, and/or connect the wireless device to the restricted wireless network 160. Configuring the wireless device may include installing any or all of the parameters, policies, and the like included in the provisioned configuration acquired from database 120. Once configured, the wireless device can access the wireless network 160 within the parameters and policies of the provisioned configuration.

Processor 140 is configured to execute a variety of operations. For example, by using authentication information concerning the user and/or the wireless device, the processor 140 may search provisioned configuration database 120 for a provisioned configuration that is associated with the user and/or the wireless device. Processor 140, by executing instructions and/or applying data sets related to and/or provided by application generation module 130, may then generate the aforementioned configuration application. Processor 140, by executing instructions and/or applying data sets related to and/or provided by provisioning module 150, may provide for the transfer of the configuration application to a wireless device over network 160.

In an exemplary embodiment of the present invention, a user submits a request for authentication and access to restricted wireless network 160. The request may include user information (e.g., user name and password) and/or wireless device information. Following an optional authentication operation, processor 140 uses the information from the request to search provisioned configuration database 120 for parameters and policies associated with the user and/or wireless device. That information concerning the aforementioned parameters and policies may then be provided to application generation module 120 for generation of a provisioned configuration application.

Provisioning module 150 is configured to deliver (or allow for the delivery/transfer) the self-configuring application generated by the application generation module 130 to a wireless device. This delivery may occur over an open access network as part of a wireless download operation. Transfer may also occur over a wired network. The parameters and policies, as included in the provisioned configuration, determine whether a user may access a particular wireless network and to what extent. For example, a user may be authorized to access only one wireless network and/or only for certain operations. The provisioned access application provided by provisioning module 150 may implement certain security and/or access policies disclosed in U.S. patent application Ser. No. 11/788,371 filed Apr. 18, 2007 and entitled "Dynamic Authentication in Secured Wireless Networks," the disclosure of which has previously been incorporated herein by reference.

Network 160 may be configured to transmit various electromagnetic waves, including, for example, radio signals. Network 160 may be an IEEE 802.11 (Wi-Fi or Wireless LAN) network, IEEE 802.16 (WiMAX) network, IEEE 802.16c network, or the like. Network 160 may convey various kinds of information to interface devices, such as client interface devices 180a-c. Network 160 may be a local, proprietary network or may be a part of a larger wide-area network.

Various subsidiary networks may reside within the realm of greater network 160 such as peer-to-peer or wireless mesh networks. Portions of network 160 may be "open" to allow for provisioning prior to a device being allowed to access "closed" portions of the same. Network 160, in some embodiments, may include a wired network for devices 170a-c (described below) to be authenticated and to download the executable application with provisioned configuration. Certain portions of network 160 may be devoted to authentication and downloading an executable provisioning application whereas other portions may be dedicated for general wireless usage.

Client wireless-interface devices 170a-c illustrate a variety of wireless-capable devices, including desktop computers, laptop computers, handheld computers, and the like. A user wishing to access the wireless network 160 through wireless device 170a, for example, may do so by copying, downloading, or otherwise transferring to wireless device 170a a copy of the application generated by application generation module 130 and made available by provisioning module 150. The application configures wireless device 170a so that wireless device 170a can access the wireless network 160 within the parameters of a provisioned configuration. Wireless device 170b and wireless device 170c may be configured in similar fashion.

Optional policy management module 180 may also be included as a part of authentication server 100. Policy management module 180 may be responsible for management and enforcement of parameters and polices of access for a device access network 160. The parameters and policies may include those implemented as a part of the provisioned configuration process. These parameters and policies may further include what users are allowed to access to particular network and to what extent (e.g., particular operations, limited access, etc.). Some wireless networks may implement policy management and enforcement through a separate server dedicated to policy management and enforcement.

Figure 2:
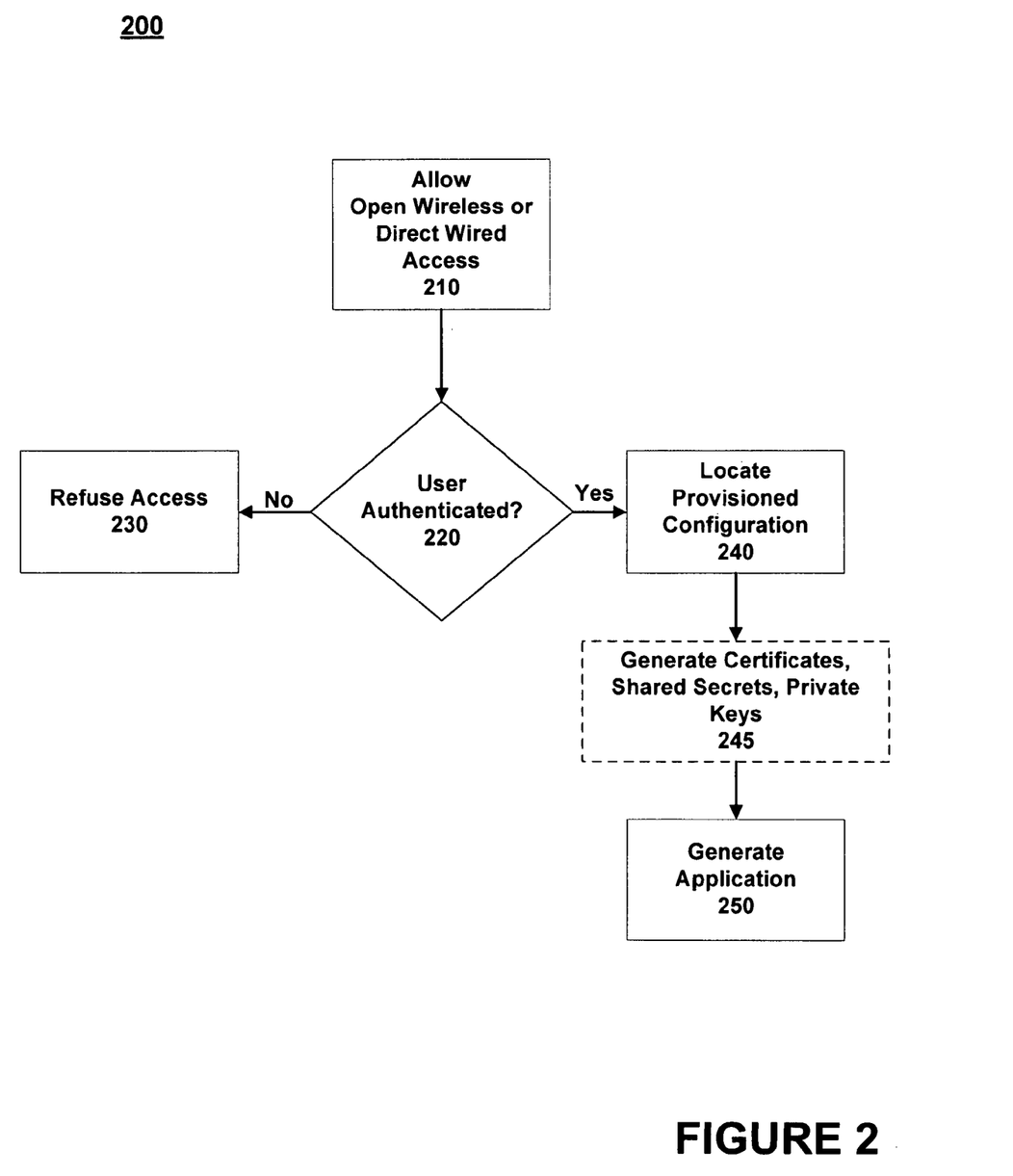
FIG. 2 is a flowchart illustrating a method for generating a configuration application in accordance with an exemplary embodiment of the present invention.

FIG. 2 is a flowchart illustrating a method 200 for generating a configuration application in accordance with an exemplary embodiment of the present invention. In method 200, a wireless device is allowed to connect to an open wireless network. It is then determined whether the user is successfully authenticated. If the user is not authenticated, the user and wireless device are refused access to the restricted wireless network. If the user is successfully authenticated, a provisioned configuration associated with the authenticated user and/or the wireless device is located. An application for configuration of the wireless device based on the provisioned configuration is generated.

In step 210, an open wireless network is accessed by a wireless device. The open wireless network is unsecured so that an unauthenticated user and/or wireless device belonging to the user may form a connection. Once the wireless device is connected to the open wireless network, the user and/or wireless device may be allowed to perform various operations, including authentication. Direct wired access may also occur in step 210.

In step 220, it is determined whether the user has been successfully authenticated. The user may be authenticated using authentication module 110 using information from the user and/or the wireless device. Initial authentication may include providing a user name and password identifying the user as a particular user. Determining whether the user is successfully authenticated may include verifying that the authentication information from the user and/or wireless device corresponds with the authentication information from the authentication database or authentication module 110.

In step 230, the user was not authenticated. This may occur where the user is not currently authorized to access the restricted wireless network, the user entered incorrect authenticated information, or the like. If a user cannot be authenticated, the user may not be allowed to access the restricted wireless network 160.

In step 240, the user has been successfully authenticated. The authentication information from the user and/or wireless device may be used to locate the provisioned configuration associated with the user and/or wireless device. Provisioned configuration database 120 may be searched and a provisioned configuration associated with the user and/or wireless device is retrieved.

In optional step 245, certificates, shared secrets (like those described in co-pending U.S. application Ser. No. 11/788,371 for "Dynamic Authentication in Secured Wireless Networks"), and/or private keys may be generated. These certificates and so forth may be generated by application generation module 130 or in conjunction with another optional application dedicated to certificate generation and so forth.

In step 250, an application including the provisioned configuration is generated by application generation module 130. This application may include the certificates and so forth generated in optional step 245. In some embodiments, the generation operations of step 245 and 250 may be consolidated into a single operation. Using the provisioned configuration located in step 240, application generation module 130 generates an application that, when executed, will configure the wireless device or another wireless device so that the wireless device can access restricted wireless network 160 within the parameters and policies for the user and/or wireless device.

Figure 3:
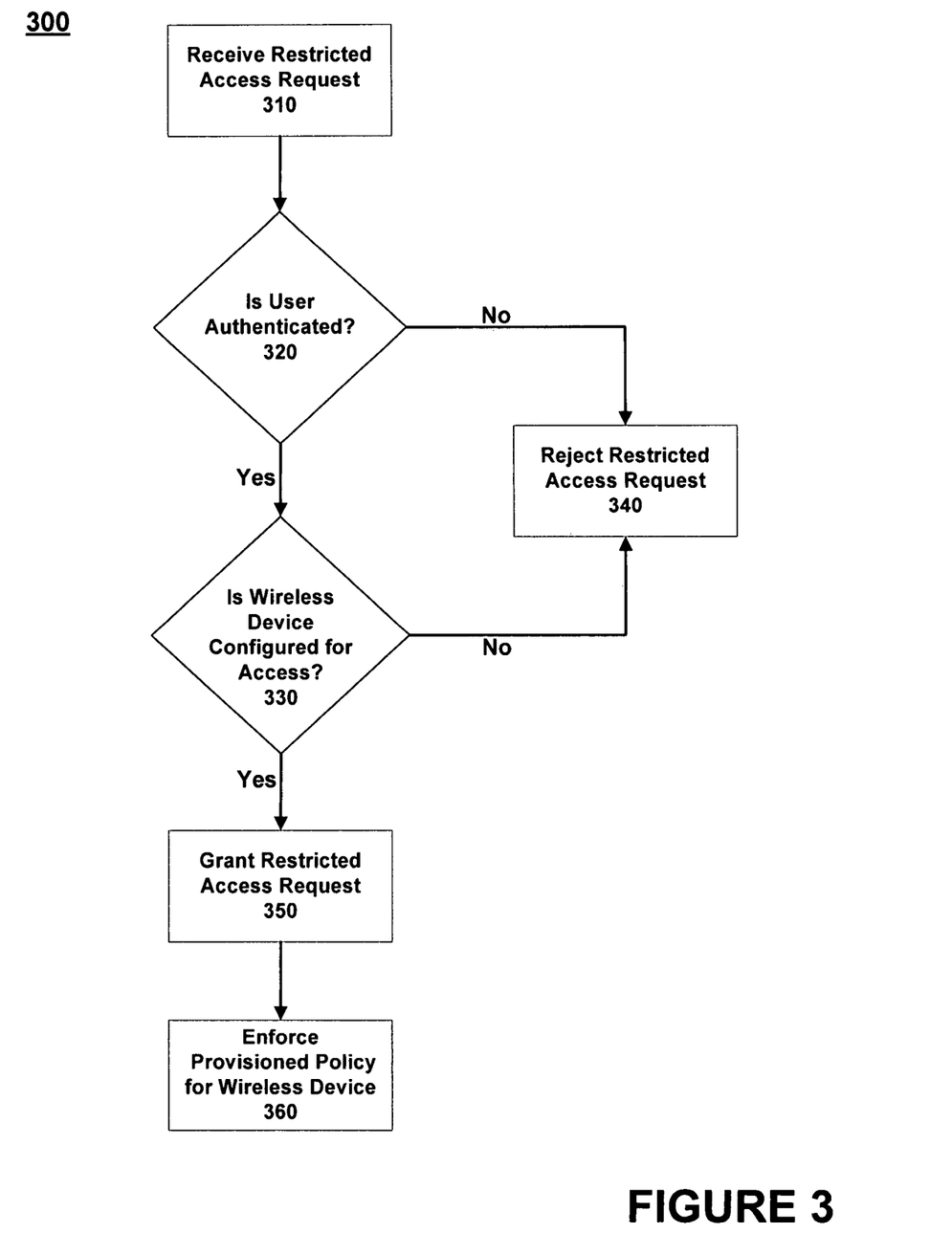
FIG. 3 is a flowchart illustrating a method for wireless devices to access a restricted wireless network in accordance with an exemplary embodiment of the present invention.

FIG. 3 is a flowchart illustrating a method 300 for wireless devices to access a restricted wireless network 160 in accordance with an exemplary embodiment of the present invention. In method 300, a request for access by a wireless device to the restricted wireless network is received. It is then determined whether the user is successfully authenticated. If the user cannot be successfully authenticated, the request for access is denied. If the user has been successfully authenticated, it is then determined whether the wireless device has a provisioned configuration that would allow for access to the restricted wireless network 160. If the wireless device has no such provisioned configuration, the request for access to the restricted wireless network 160 is denied. If the wireless device does have a provisioned configuration allowing for access, the request is granted. Further, the parameters and policies of the particular provisioned configuration are enforced for the user, wireless device, and their operations within the restricted wireless network.

In step 310, a request for access to a restricted wireless network 160 is received from a wireless device belonging to a user. The request for access may be received through an open wireless network, a wired connection, or the like.

In step 320, it is determined whether the user has been successfully authenticated. The determination may be performed in a manner similar to that of step 220. If the determination is that the user has been successfully authenticated, the method proceeds to step 330. If the determination is that the user has not been successfully authenticated, the method proceeds to step 340.

In step 330, it has been determined that the user was not successfully authenticated and the request for access to the restricted wireless network 160 is rejected. This may occur where the user is not currently authorized to access the restricted wireless network, the user entered incorrect authenticated information, or the like. Rejection of the access request may include terminating the connection, enforcing various security measures (e.g., identifying the illicit or unauthorized access attempt by date, time, and indicia of the user attempting access), or the like.

In step 340, it has been determined that the user was successfully authenticated. It is then determined whether the wireless device is configured for access to the restricted wireless network. The determination may be made by surveying the wireless device, information from the authentication request, comparing the configuration of the wireless device with the provisioned configuration in provisioned configuration database 120, or the like. If the wireless device has been configured for access to the restricted wireless network 160, the method proceeds to step 350. If it is determined that the wireless device is not configured, the method proceeds to step 330. Determinations made in step 350 may utilize those techniques disclosed in U.S. patent application Ser. No. 11/788,371 filed Apr. 18, 2007 and entitled "Dynamic Authentication in Secured Wireless Networks," the disclosure of which has previously been incorporated herein by reference.

In step 350, the wireless device has been determined to have been configured for access to the restricted wireless network 160, and the request for access is granted. In some embodiments, the wireless device may be automatically connected to the restricted wireless network 160. Alternatively, the connection may be made manually.

In step 360, access by the wireless device to restricted wireless network 160 is governed by the parameters and policies of the provisioned configuration. Optional policy enforcement module 180 may enforce those parameters and policies, so that the user may only access the network or networks for which the user is authorized.

Figure 4:
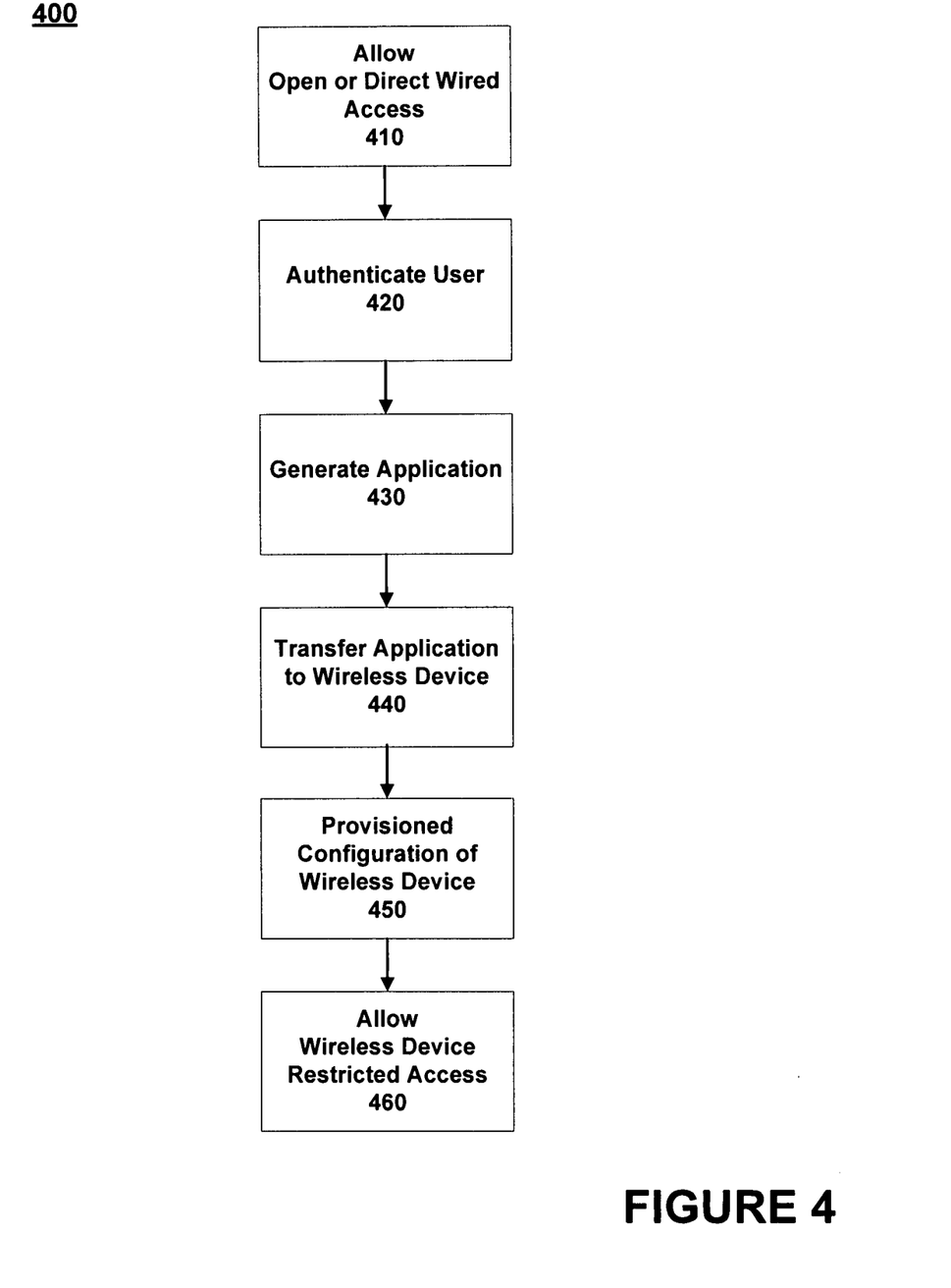
FIG. 4 is a flowchart illustrating a method for provisioned configuration of a wireless device to access a restricted wireless network in accordance with an exemplary embodiment of the present invention.

FIG. 4 is a flowchart illustrating a method for provisioned configuration of a wireless device to access a restricted wireless network 160 in accordance with an exemplary embodiment of the present invention. A wireless device belonging to a user is allowed to connect to an open wireless network. The user is authenticated. Using information from authentication, a configuration application is generated. The application is then transferred to the wireless device. The application provides a provisioned configuration for the wireless device. Once the wireless device is configured, the wireless device may be allowed to access the restricted wireless network 160.

In step 410, the wireless device belonging to the user is allowed to access an open wireless network. The connection to the open wireless network may be similar to that of step 210. Also like step 210, direct wired access may be provided.

In step 420, the user is authenticated using authentication module 110. Authentication of the user and/or wireless device may occur by comparing various information such as user names and passwords against information in an authentication database or authentication module 110. Techniques disclosed in U.S. patent application Ser. No. 11/788,371 filed Apr. 18, 2007 and entitled "Dynamic Authentication in Secured Wireless Networks," the disclosure of which has previously been incorporated herein by reference, may also be utilized.

In step 430, an application including the provisioned configuration is generated by application generation module 130. The generation of the application may occur similarly to the generation of the application in step 250.

In step 440, the application is transferred to the wireless device via provisioning module 150. The application may be copied, downloaded, or otherwise transferred to the wireless device. In some embodiments, the application may be automatically transferred to the wireless device after the application is generated in step 430. Alternatively, the application may be made available for the user to copy, download, or otherwise transfer over the open wireless network. The application may also be provided as a part of a computer-readable medium such as an installation CD or via portable flash memory cards.

In step 450, the application as provided by provisioning module 150 is executed and provides a provisioned configuration for the wireless device to access restricted wireless network 160. The application transferred in step 440 may be executed automatically or by the user to install the provisioned configuration, including the various parameters and policies associated with the user and/or wireless device. After the provisioned configuration is installed, the wireless device becomes capable of accessing the restricted wireless network 160

In step 460, the wireless device connects to and accesses the restricted wireless network 160. The wireless device may be connected to the restricted wireless network 160 either automatically or manually. The access to restricted wireless network 160 is governed by the parameters and policies of the provisioned configuration installed on the wireless device and other security measures as may be implemented server-side to maintain to the security of the network 160. Parameters and polices may be enforced by policy management module 180.

While the present invention has been described in connection with a series of preferred embodiment, these descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art.

What is claimed is:

1. A method for provisioned configuration of a wireless device, the method comprising:
   authenticating a user of the wireless device at an authentication server;
   identifying a set of parameters and policies associated with the user and the wireless device, the set of parameters and policies identified from a provisioned configuration database in memory that stores a plurality of parameters and policies;
   generating an executable application based on authentication information regarding the user and provided by the wireless device, the generated executable application being executable to install the identified set of parameters and policies, wherein the executable application is generated through execution of an application generation module stored in memory at the authentication server;

transferring the executable application from the authentication server to the wireless device, wherein execution of the executable application by the wireless device configures the wireless device for access to a restricted wireless network, wherein the configuration includes installing at the wireless device the identified set of parameters and policies governing access by the user and the wireless device to the restricted wireless network; and restricting access of the wireless device to the restricted wireless network at the authentication server, wherein access to the restricted wireless network is allowed based on at least the set of parameters and policies installed on the wireless device as a part of the wireless device configuration by the executable application.

2. The method of claim 1, wherein the configuration further includes a certificate.

3. The method of claim 1, wherein the configuration further includes a shared secret.

4. The method of claim 1, wherein the configuration further includes a private key.

5. The method of claim 1, wherein authenticating the user of the wireless devices occurs over an open wireless network.

6. The method of claim 1, wherein authenticating the user of the wireless device occurs over a wired network.

7. The method of claim 1, wherein the authentication information is associated with provisioned configuration information in a provisioned configuration database.

8. The method of claim 1, further comprising associating the configuration settings for the wireless device with the authentication information in a provisioned configuration database.

9. The method of claim 1, wherein the authentication information comprises information concerning the user.

10. The method of claim 1, wherein the authentication information comprises information concerning the wireless device.

11. The method of claim 1, wherein the executable application includes a plurality of configuration settings for the wireless device.

12. The method of claim 11, wherein each of the plurality of configuration settings includes parameters and policies for a different restricted wireless network.

13. The method of claim 11, wherein each of the plurality of configuration settings includes a certificate.

14. The method of claim 11, wherein each of the plurality of configuration settings includes a shared secret.

15. The method of claim 11, wherein each of the plurality of configuration settings includes a private key.

16. A system for provisioned configuration of a wireless device, the system comprising:

an authentication module stored in memory and executable by a processor to authenticate a user of the wireless device;

a provisioned configuration database stored in memory and including a provisioned configuration for the wireless device, the provisioned configuration based on at least authentication information identified by the execution of the authentication module, wherein the provisioned configuration includes parameters and policies for installation in the wireless device, the parameters and policies governing access to a restricted wireless network; and an application generation module stored in memory at an authentication server and executable by the processor to:

identify a set of parameters and policies associated with the user and the wireless device, the set of parameters and policies identified from the provisioned configuration database;

generate an executable application for the wireless device based on authentication information regarding the user and provided by the wireless device, the executable application being executable by the wireless device to configure the wireless device for access to the restricted wireless network based on at least the provisioned configuration, wherein the configuration includes installing at the wireless device the identified set of parameters and policies governing access by the user and the wireless device to the restricted wireless network, wherein access to the restricted wireless network is allowed based on at least the set of parameters and policies.

17. The system of claim 16, wherein the authentication information comprises information concerning the user.

18. The system of claim 16, wherein the authentication information comprises information concerning the wireless device.

19. The system of claim 16, wherein the provisioned configuration database is further configured to store information concerning a plurality of parameters and policies of access to restricted wireless networks, associations with users, and associations with wireless devices.

20. The system of claim 16, wherein the provisioned configuration database is further configured to store information concerning certificates.

21. The system of claim 16, wherein the provisioned configuration database is further configured to store shared secrets.

22. The system of claim 16, wherein the provisioned configuration database is further configured to store private keys.

23. The system of claim 16, further comprising a provisioning module stored in memory and executable by a processor to deliver the generated executable application to the wireless device over a communications network.

24. The system of claim 23, wherein the communications network is an open wireless network.

25. The system of claim 23, wherein the communications network is a wired network.

26. The system of claim 23, wherein the executable application is executable to provide a plurality of provisioned configurations.

27. The system of claim 26, wherein each of the plurality of provisioned configurations includes parameters and policies for a different restricted wireless network.

28. A non-transitory computer-readable storage medium having embodied thereon a program, the program being executable by a computer processor to perform a method for provisioned configuration of a wireless device, the method comprising:

authenticating a user of the wireless device;

identifying a set of parameters and policies associated with the user and the wireless device, the set of parameters and policies identified from a provisioned configuration database in memory that stores a plurality of parameters and policies;

generating an executable application based on authentication information regarding the user and provided by the wireless device, the generated executable application being executable to install the identified set of parameters and policies, wherein the executable application is generated through execution of an application generation module stored in memory at the authentication server;

transferring the executable application to the wireless device, wherein execution of the executable application by the wireless device configures the wireless device for access to a restricted wireless network, wherein the configuration includes installing at the wireless device the identified set of parameters and policies governing access by the user and the wireless device to the restricted wireless network; and restricting access of the wireless device to the restricted wireless network based on at least the set of parameters and policies installed on the wireless device as a part of the wireless device configuration by the executable application.

\* \* \* \* \*